L. L. Davis.
Adjustable Spirit Level.
N° 68,961. Patented Sep. 17. 1867.
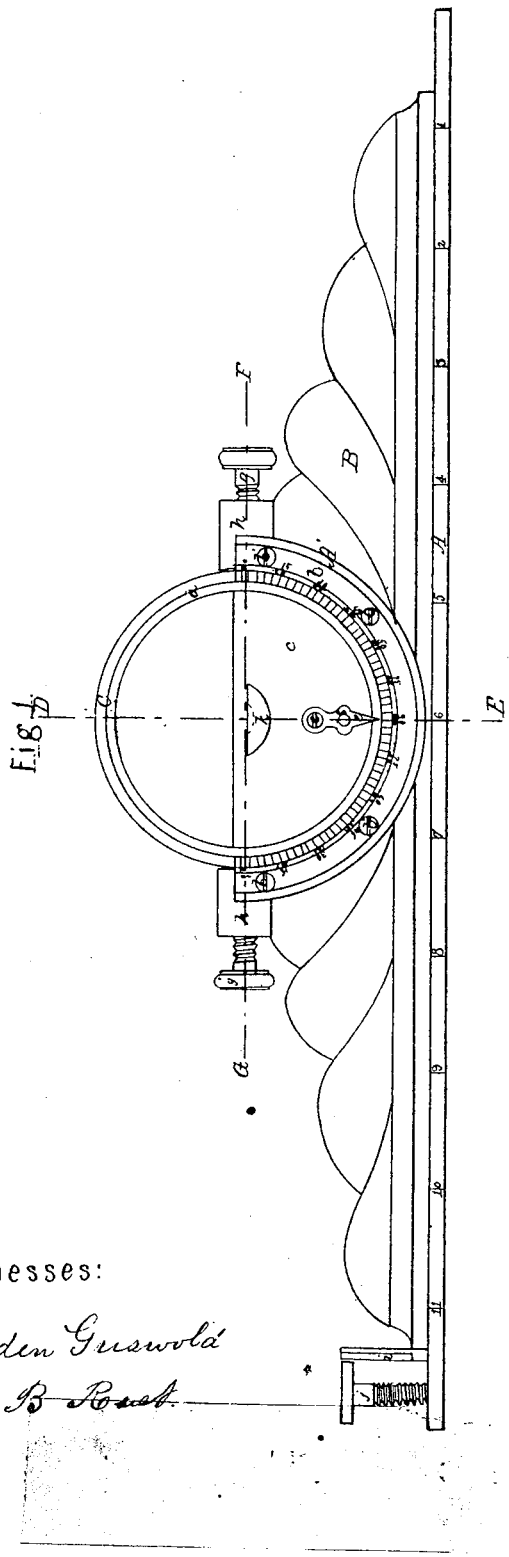
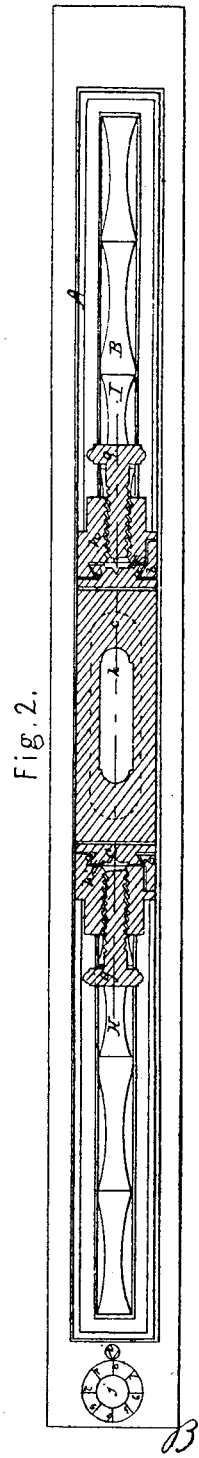
Witnesses:
Ogden Griswold
M. B. Root
Inventor:
Buckland & Curtis
Attorneys for L. L. Davis

L. L. Davis.
Adjustable Spirit Level.
No 68,961.
Patented Sep 17, 1867.
2 Sheets.
Sheet 2.
Fig. 4.
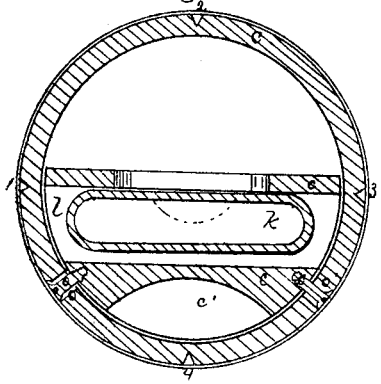
Fig. 3.
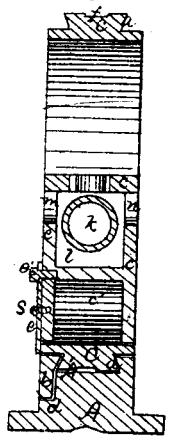
Witnesses:
Ogden Guswold
M B Post
Inventor:
Buckland & Curtis
Attorneys for L. L. Davis

United States Patent Office.

L. L. DAVIS, OF SPRINGFIELD, MASSACHUSETTS.

Letters Patent No. 68,961, dated September 17, 1867.

---

IMPROVEMENT IN ADJUSTABLE SPIRIT-LEVELS.

---

*The Schedule referred to in these Letters Patent and making part of the same.*

---

TO ALL WHOM IT MAY CONCERN:

Be it known that I, L. L. DAVIS, of Springfield, in the county of Hampden, and Commonwealth of Massachusetts, have invented a new and useful improved Adjustable Spirit-Level; and I do hereby declare that the following is a full, clear, and exact description thereof, reference being had to the accompanying drawings, making a part of this specification, and to the letters of reference marked thereon, in which—

Figure 1 is a side elevation.

Figure 2 is a horizontal section through line G F of fig. 1.

Figure 3 is a vertical transverse section through line D E of fig. 1; and

Figure 4 is a vertical longitudinal section of the bubble-case and ring through the plane indicated by the line H I of fig. 2.

The nature of my invention consists in so arranging a spirit-level that a broken bubble may be easily and quickly replaced, and the level be speedily put in perfect adjustment, and also the level so arranged as to admit of an easy and speedy adjustment for working any surface to any desired inclination or position.

One of the principal objections to the inclinometers, as they are termed, is that the degree of inclination or deviation from a perfect level or plumb is indicated by degrees or parts of a circle marked upon the instrument, without any other method of indicating such degree of inclination. The majority of mechanics are more familiar with, and work altogether by, linear measurement, and do not accustom themselves to the measurement of angles in their ordinary mechanical labor; but my invention the most ordinarily educated mechanic can use understandingly and with facility, while, at the same time, the professional engineer can use the same by the measurement of angles, if he so elects.

To enable others skilled in the art to make and use my invention, I will proceed to describe its construction and application to use.

In the drawings, A is the base portion of the level, the lower edge of which has a scale of inches, and fractional parts, if desired, upon it. This base portion A is strengthened and braced by the part B, so as to firmly and strongly connect the sockets $h$ $h'$ and the socket A' to the plate A. The socket A' is made nearly or quite the same thickness as the ring C, and is the socket or receptacle in which the ring C turns. The socket A' has an oblique or dove-tailed shoulder at $a$, and the corresponding portion on the other side is cut away, or has a right-angled shoulder, $d$, into which the piece $b$ is fitted. This piece $b$ is made so that when it is in place, its upper part, on the inside, corresponds to the oblique or dove-tailed shoulder $a$ upon the other side. The ring C is made with two oblique shoulders upon its periphery, forming a dove-tail or flange, which fits into the socket A', made by the piece $b$ and the shoulder $a$, and is confined in the socket A' by the piece $b$ being screwed or secured to the base of the socket A'.

This mode of manufacture obviates the necessity of extending the socket A' any more than half way around the circumference of the ring C, which facilitates its adjustment and use. The inside of the ring C, or its inner periphery C', is made plane or flat, so that the bubble-case $c$ fits into it and is kept in place by the screws $o$ $o$, passing through the holes $o'$ $o'$ in the ring C, these holes $o'$ $o'$ being slotted to admit of a slight axial movement of the bubble-case $c$ for the purpose of adjustment.

The indentations 1 2 3 4 are made in the periphery of the ring C, into which the point of the screw $g$ fits when it is desired to set the level for plumbing or levelling perpendicular or horizontal surfaces.

Extending longitudinally through the bubble-case $c$ is the aperture $l$, and a portion on the lower side of the bubble-case $c$ is cut away, or the bubble-case $c$ is cast with a space, $c'$, which saves stock and renders the instrument lighter. Into either end of the aperture or space $l$ is inserted the bubble-glass $k$, around which is put wet calcined gypsum, which, when dry, holds it in place.

The bubble can be seen through an aperture in the top of the case $c$, and also through apertures $m$ $n$ in the side of the case $c$.

The channel $f$ is cut upon the periphery of the ring C, the surface of which channel is smooth to furnish a bearing for the friction-screw $g'$, when it is tightened or screwed in, and the periphery of the ring C, on each side of the channel $f$, is milled to facilitate its use.

To adjust the instrument for use, I proceed as follows: After the bubble-glass $k$ has been inserted and secured in place in the bubble-case $e$, the bubble-case $e$ is inserted or pushed into its place in the ring C, the screws $o$ $o$ are screwed into the bubble-case $e$ through the slots $o'$ $o'$, and the ring C is then pushed into its place in the socket $A'$, and the instrument properly adjusted by giving the bubble-case $e$ a slight axial movement in either direction, as is required.

When adjusted, the ring C is removed from the socket $A'$, the screws $o$ $o$ are tightened in their places, and the ring C put back into place in the socket $A'$, and the piece $b$ is put into place and secured by screws $b'$ $b'$ $b'$ $b'$. Upon the inner edge of the piece $b$ is a circular scale, and upon the bubble-case $e$ is the index $e$, secured by the screws $c'$ and $s$. The screw $s$ passes through a hole in the index $e$, which is slotted to allow of a lateral movement of the index $e$ for the purpose of adjusting it to the level. When properly adjusted, the index is secured in place by the screw $s$.

At one end of the base part A is a hole having a female screw thread cut in it, through which passes the screw $j$, having a screw-thread cut upon it of thirty-two threads to an inch. Near this screw $j$, and fastened to the base part A, is the post $i$, the upper part of which is sharp, or has an edge, and comes nearly in contact with the top of the screw $j$, and acts as an index to the top of the screw $j$, the upper surface of which is divided into eight equal parts or divisions, and, as the screw has thirty-two threads to an inch, and the base A is one foot long, if, when the lower end of the screw is even with the lower side of the base A, the screw $j$ be turned in or down one revolution, that end of the base A will be raised one thirty-second of an inch; if two revolutions, it is raised one-sixteenth of an inch; if four revolutions, one-eighth of an inch, and so on. The screws $h$ $h'$ are then drawn out a short distance, and the ring C turned in its socket $A'$ until the bubble is in the middle of the glass, when the friction-screw $g'$ is tightened or turned in against the ring C, and the elevating-screw $j$ is turned out again, that it may not protrude through the base A.

In this way the instrument can be adjusted to work upon a surface at any degree of inclination. As an elevation of one-half an inch to a foot corresponds to two and a half degrees, it is only necessary, in greater elevations, to calculate how far to move the index $e$ on the scale without using the elevating-screw $j$.

For the usual operations of levelling, the level being adjusted, the point of the screw $g$, when screwed in, enters the socket 3 in the ring C. For plumbing perpendicular surfaces, the ring C is turned one-quarter of a revolution either way, and the screw $g$ is tightened, which holds the ring C in its place. For levelling shafting overhead, the ring C is turned one-half a revolution, and the screw $g$ tightened, and, in order that the base A of the level may be perfectly parallel to the axis of the shaft, a groove is cut longitudinally along the bottom of the base A, equidistant from its sides, which may be placed against the shaft.

I am aware that different devices have been used, admitting of an axial movement of the bubble-case, in the adjustment of the level, and also of the use of a circular scale and index to denote the inclination or deviation from a perfect horizontal or perpendicular, but to the use of many such devices there are serious and practical objections, among which I may mention, first, that the bubble-glass has to be made to nearly fit the case into which it is put, as, if too small, it will be loose in the case, and there is no way to pack the case around the bubble-glass after it is put in; second, their reliability depends upon the action of springs, which are liable to get loose or break, rendering the level unreliable.

My invention admits the use of bubble-glasses of irregular sizes, and when desirable to put one in, it is put in with more ease and facility, and may be set in properly with calcined gypsum or any other proper packing, is adjusted with greater facility, is capable of being made much lighter, thus rendering it more convenient for general use, and is not so expensive in its manufacture.

I do not confine myself to the use or manufacture of a level with a bubble-case having an axial movement irrespective of my arrangement, but having described my invention, what I do claim as new, and desire to secure by Letters Patent, is—

1. The semicircular bubble-case $c$, when constructed or cast in one piece, and having the aperture or space $l$ for the insertion of the bubble-glass $k$ and the space $e'$, substantially as herein described and set forth.

2. The ring C, having a dove-tail flange around its periphery and working in the dove-tail socket $A'$, when made substantially as herein described and set forth.

3. The ring C, in combination with the dove-tail socket $A'$, the set-screw $g$, the friction-screw $g'$, and the bubble-case $c$, when made substantially as herein described and set forth.

4. The elevating-screw $j$ and index $i$, in combination with the base A, socket $A'$, ring C, and bubble-case $e$, when made substantially as herein described and set forth.

L. L. DAVIS.

Witnesses:
   F. S. BACON,
   GEO. B. PIERCE.